UNITED STATES PATENT OFFICE

STANLEY L. HANDFORTH, OF WOODBURY, NEW JERSEY, ASSIGNOR TO E. I. DU PONT DE NEMOURS & COMPANY, OF WILMINGTON, DELAWARE, A CORPORATION OF DELAWARE

PROCESS FOR THE PRODUCTION OF NITRITES

No Drawing.  Application filed June 29, 1929. Serial No. 374,913.

This invention relates to a process of producing nitrites and particularly sodium nitrite, and to an improved method for making these compounds from gases containing NO and $NO_2$. This invention is characterized in that the finished liquors contain a minimum of nitrates and free alkali.

It is well known that if gases containing nitric oxide and nitrogen dioxide, NO and $NO_2$, and that these gases contain more NO than $NO_2$, are brought into contact with alkaline solutions the NO and $NO_2$, will be absorbed with the formation of nitrites. These gases may be formed by the arc process of nitrogen fixation, by the oxidation of ammonia, or they may be the waste gases from an absorption process of which nitric acid is the primary product.

Prior art processes in general comprise passing the gases containing the oxides of nitrogen through absorption towers over which is sprayed or circulated the absorption liquor. Theoretically, the following reactions take place.

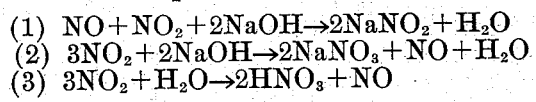

In acid solutions, reaction (3) takes place almost exclusively. In alkaline solutions, reaction (1) predominates. In practice a charge of alkaline solution is usually made up and circulated over the towers until all or almost all of the free alkali has been used up by reactions (1) and (2). In some cases, in order to make more concentrated solutions, alkali is added from time to time as it is used up until the desired concentration is reached. The most generally used alkali for this purpose is soda ash (sodium carbonate) because of its low cost. Caustic soda, lime, or other bases may be used depending on the salt desired. If there is more $NO_2$ than NO present, reaction (2) takes place. Also the NO is gradually oxidized to $NO_2$ by the oxygen present. As a result the formation of nitrite may involve the formation of a certain amount of nitrate. This nitrate is of much less value than the nitrite and in addition renders more difficult the recovery of nitrites of a desired purity. It is therefore advantageous to so operate as to reduce nitrate formation to a minimum.

This invention has as an object the production of nitrite liquors containing a minimum amount of nitrate and of free alkali. A further object of the invention is a method of control of the process so that these results may be obtained. Other objects will appear as the description proceeds.

These objects are accomplished by the following invention in which I have found that it is not only necessary that the absorbing solution be alkaline but that the degree of alkalinity has a marked effect on the ratio of nitrate to nitrite formed. I have further found that the formation of nitrite very nearly stops even when the solution is still appreciably alkaline. According to the general nomenclature, a solution is neutral when the hydrogen ion concentration equals a pH value of 7. I have found that even when the absorbing solution is still alkaline with a pH value of 8 that there is almost as much nitrate formed as nitrite.

The general effect of the degree of alkalinity may easily be shown roughly by means of a curve which, as will be apparent, would indicate that as the degree of alkalinity increases, the formation of nitrate decreases rapidly up to pH of 10.5 and slowly thereafter. According to my invention, therefore, it is necessary, in order to have a minimum amount of nitrate formed, that the solution must be kept at an alkalinity greater than a pH value of 10 throughout the process, or at least until the solution is to be neutralized. If solutions of caustic alkalies are used, it is relatively easy to keep the alkalinity of the solution above a pH value of 11.

However, the cost of caustic precludes its use in most instances, and for this reason sodium carbonate (soda ash) is the most generally used alkali. Sodium carbonate solutions, however, are relatively weakly alkaline and crystallize out when it is attempted to increase the concentration too greatly. As a result, it is difficult to obtain solutions much more alkaline than a pH value of 11.5.

As the concentration of other salts in the solution increases the alkalinity of a carbonate solution decreases, and also the solubility of the carbonate in it decreases, so that in strong nitrite solutions it is difficult to maintain the alkalinity greater than a pH value of 10 without danger of the carbonate crystallizing in the absorption apparatus.

I have found that a satisfactory way to overcome these difficulties is to start with an absorbing solution containing sufficient carbonate to maintain the alkalinity close to a pH value of 11 and to maintain this by the gradual addition of soda ash. As the concentration of salts in the solution increases, allow the alkalinity to gradually decrease until when the concentration of salts in the solution has become such that the specific gravity of the solution is greater than 1.200, the alkalinity is just below a pH value of 10. It has not been found advisable to try to produce solutions of a specific gravity much greater than 1.250. When a point is reached such that the finished solution will be of about this strength, the solution should be nearly neutralized by stopping the addition of carbonate and continuing the absorption until the alkalinity has decreased to a pH value of 7.5 to 8. Thus the absorbing solution is maintained at an alkalinity greater than a pH value of 10.0 for practically the entire absorption period. While it is desirable to maintain a higher alkalinity than this, it has not been found possible to do so when using a carbonate as the alkali, since, with concentrations greater than this, the carbonate will crystallize out.

There is a decided advantage in keeping the absorbing solution hot when carbonates are used. Warm or hot solutions not only increase the hydrolysis of the carbonate and increase the alkalinity for a given carbonate concentration, but also help prevent crystallization and precipitation of hydrated carbonates or bicarbonates.

On the other hand, when using a caustic alkali such as sodium hydroxide, or other strong alkali, it has been found advisable to maintain the alkalinity above a pH value of 13 until the solution is ready to neutralize.

When using carbonate as the alkali, I found it to be necessary to maintain a concentration of nearly 1.5% $Na_2CO_3$ in the solution in order to keep the alkalinity greater than a pH value of 10 when the total gravity of the solution has become as great as 1.200 sp. gr. In order to reduce this quantity of free alkali and practically neutralize the solution, it is necessary to operate for quite an appreciable period of time at an alkalinity of less than a pH value of 10. With a caustic alkali such as sodium hydroxide, a concentration of 0.1% will give an alkalinity greater than a pH value of 10. Thus when reducing the free alkali in the solution and neutralizing the solution it is only necessary to operate for an extremely short period of time at an alkalinity less than a pH value of 10 if caustic alkali is used at the finishing of a charge.

I have found that it is thus possible to get a great part of the advantage of the higher alkalinity of the caustic with the lower cost of soda ash by maintaining an alkalinity during the major portion of the formation of a charge of liquor by the gradual addition of soda ash and maintaining the alkalinity greater than a pH value of 10, then after the concentration of salts in the solution has increased so that the gravity of the solution is 1.200 or over or just before finishing the charge, a caustic alkali such as sodium hydroxide or lime is added. The alkalinity will be greately increased and the formation of nitrate will not increase and it will also then be necessary to operate for only a very minimum of time at an alkalinity of less than a pH value of 10 while neutralizing the solution. If lime is used for this purpose, only sufficient lime is used to precipitate the carbonic acid in the solution. The calcium carbonate is then removed by filtration or settling before the solution is evaporated. If sodium hydroxide is used, the process is carried on for an appreciable period of time as I have found that by doing this the greater part of the carbonate in the solution will be decomposed in this process even in the presence of the excess alkali.

Thus in the general process, a gas containing appreciable amounts of NO and $NO_2$, but which must contain more NO than $NO_2$, is brought in contact with an alkaline liquor, the alkalinity of which is controlled as specified above.

As many apparently widely different embodiments of this invention may be made without departing from the spirit thereof, it is to be understood that I do not limit myself to the foregoing examples or descriptions except as indicated in the following patent claims.

I claim:

1. The process of manufacturing a nitrite containing a minimum amount of nitrate which comprises bringing a gas containing appreciable quantities of NO and $NO_2$ into contact with an alkaline absorbing solution maintained at a pH value between 9.5 and 11.

2. The process of manufacturing a nitrite containing a minimum amount of nitrate which comprises bringing a gas containing appreciable quantities of NO and $NO_2$, and containing more NO than $NO_2$, into contact with an alkaline absorbing solution maintained at a pH value between 9.5 and 11.

3. The process of manufacturing a nitrite which comprises bringing a gas containing appreciable quantities of NO and $NO_2$ into contact with an alkaline absorbing solution maintained at a pH value between 9.5 and 11 by the addition of a soluble carbonate and absorbing the NO and $NO_2$ therein.

4. The process of manufacturing a nitrite containing a minimum amount of nitrate which comprises bringing a gas containing appreciable quantities of NO and $NO_2$, and containing more NO than $NO_2$, into contact with an alkaline absorbing solution maintained at a pH value between 9.5 and 11 by the addition of a soluble carbonate.

5. In the batch production of sodium nitrite the process which comprises bringing a gas containing appreciable quantities of NO and $NO_2$, and containing more NO than $NO_2$, into contact with a soda solution, the alkalinity of which is maintained at a pH value between 10 and 11 by the gradual addition of a soluble carbonate until the total concentration of the solution reaches the point where the gravity exceeds 1.200 and then maintaining the alkalinity at a pH value between 9.5 and 10 until completion of the charge.

6. In the production of a nitrite, the process which comprises bringing a gas containing appreciable quantities of NO and $NO_2$, and containing more NO than $NO_2$, into contact with an alkaline absorbing solution maintained at a pH value between 9.5 and 11 during the major portion of the formation of the charge by the gradual addition of a soluble carbonate and maintaining the temperature of the liquor between 40° C. and 80° C.

7. In the production of a nitrite, the process which comprises bringing a gas containing appreciable quantities of NO and $NO_2$, and containing more NO than $NO_2$, into contact with an alkaline solution maintained at a pH value between 10 and 11 by the gradual addition of an alkaline compound during a major portion of the process, then reducing the alkalinity to a pH value of 9.5 to 10, stopping the addition of the alkaline compound and completing the process at an alkalinity of 7.5 to 8 to neutralize the liquor and reduce the amount of free alkalinity contained therein.

8. The process of claim 7 in which the temperature of the liquid is maintained between 40° C. and 80° C.

9. In the production of a nitrite, the process which comprises bringing a gas containing appreciable quantities of NO and $NO_2$ into contact with an alkaline hydroxide absorbing solution maintained at a pH value greater than 13.

10. In the production of a nitrite containing a minimum amount of nitrate, the process which comprises bringing a gas containing appreciable quantities of NO and $NO_2$, and containing more NO than $NO_2$, into contact with an alkaline hydroxide absorbing solution maintained at a pH value greater than 13.

11. In the production of a nitrite, the process which comprises bringing a gas containing appreciable quantities of NO and $NO_2$, and containing more NO than $NO_2$, into contact with an alkaline solution maintained at a pH value above 10 by the gradual addition of a soluble carbonate during the major portion of the formation of the charge, and for a short time before finishing the charge maintaining the pH value above 12 by the addition of an alkali hydroxide to the charge until ready to neutralize.

12. The process of claim 11 in which the temperature of the liquor is maintained between 40° C. and 80° C.

13. In the production of a nitrite, the process which comprises bringing a gas containing appreciable quantities of NO and $NO_2$, and containing more NO than $NO_2$, into contact with an alkaline solution maintained at a pH value above 10 by the gradual addition of a soluble carbonate during the major portion of the formation of the charge, adding an alkaline earth compound taken from a group comprising the hydroxide and the oxide to convert the remaining carbonate to hydroxide and precipitate the alkaline earth carbonate and then adjusting the alkalinity to near the neutralizing point.

14. In the production of a nitrite, the process which comprises bringing a gas containing appreciable quantities of NO and $NO_2$, and containing more NO than $NO_2$, into contact with an alkaline solution maintained at a pH value of 10 by the gradual addition of a soluble carbonate during the major portion of the formation of the charge, adding an alkaline earth compound taken from a group comprising the hydroxide and the oxide to convert the remaining carbonate to hydroxide and precipitate the alkaline earth carbonate, and removing the precipitated carbonate.

15. The process of producing a nitrite which comprises starting the process with an absorbing solution containing sufficient carbonate to maintain the alkalinity close to a pH value of 11, maintaining this value substantially constant for a time by the gradual addition of soda ash, allowing the alkalinity to gradually decrease as the concentration of the salts in the solution increases until the concentration of salts in the solution has become such that the specific gravity of the solution is greater than 1.200, substantially neutralizing the solution, and continuing the absorption until the alkalinity has decreased to a pH value of 7.5 to 8.

In testimony whereof, I affix my signature.

STANLEY L. HANDFORTH.